(12) United States Patent
Lecocq et al.

(10) Patent No.: US 10,510,179 B2
(45) Date of Patent: Dec. 17, 2019

(54) METHOD AND DEVICE FOR ENRICHING THE CONTENT OF A DEPTH MAP

(71) Applicant: THOMSON LICENSING, Issy de Moulineaux (FR)

(72) Inventors: Pascal Lecocq, Saint Gregoire (FR); Pascal Gautron, Rennes (FR); Jean-Eudes Marvie, Betton (FR)

(73) Assignee: THOMSON LICENSING, Issy-de-Moulineaux (FR)

( * ) Notice: Subject to any disclaimer, the term of this patent is extended or adjusted under 35 U.S.C. 154(b) by 13 days.

(21) Appl. No.: 14/767,281

(22) PCT Filed: Feb. 7, 2014

(86) PCT No.: PCT/EP2014/052396
§ 371 (c)(1),
(2) Date: Aug. 11, 2015

(87) PCT Pub. No.: WO2014/124871
PCT Pub. Date: Aug. 21, 2014

(65) Prior Publication Data
US 2016/0005213 A1    Jan. 7, 2016

(30) Foreign Application Priority Data

Feb. 12, 2013  (EP) .................................... 13305164
Jun. 12, 2013  (EP) .................................... 13305792

(51) Int. Cl.
*G06T 15/10*    (2011.01)
*G06T 15/60*    (2006.01)
(Continued)

(52) U.S. Cl.
CPC ................ *G06T 15/10* (2013.01); *G06T 1/20* (2013.01); *G06T 7/529* (2017.01); *G06T 15/60* (2013.01); *G06T 17/20* (2013.01); *G06T 2215/12* (2013.01)

(58) Field of Classification Search
None
See application file for complete search history.

(56) References Cited

U.S. PATENT DOCUMENTS 5,900,955 A  *  5/1999  Yoshikawa ............ G02B 26/12
                                                          359/17
8,253,740 B2     8/2012  Varekamp et al.
(Continued)

FOREIGN PATENT DOCUMENTS

WO    WO2007096816    8/2007
WO    WO2012175731    12/2012

OTHER PUBLICATIONS

Hertel, S., Hormann, K., Westermann, R., A Hybrid Gpu Rendering Pipeline for Alias-Free Hard Shadows, Mar. 2009, Eurographics 2009 Area Papers, pp. 59-66.*

(Continued)

*Primary Examiner* — Said Broome
(74) *Attorney, Agent, or Firm* — Tutunjian & Bitetto, P.C.

(57) ABSTRACT

A method and device for enriching the content associated with a first element of a depth map, the depth map being associated with a scene according to a point of view. Thereafter, at least a first information representative of a variation of depth in the first element in the space of the depth map is stored into the depth map.

16 Claims, 6 Drawing Sheets

(51) Int. Cl.
  *G06T 1/20* (2006.01)
  *G06T 17/20* (2006.01)
  *G06T 7/529* (2017.01)

(56) References Cited

U.S. PATENT DOCUMENTS

| | | | |
|---|---|---|---|
| 8,743,114 B2* | 6/2014 | Kim | G06T 15/40 345/422 |
| 2006/0209065 A1* | 9/2006 | Lapidous | G06T 15/40 345/422 |

OTHER PUBLICATIONS

Isidoro:"Shadow Mapping GPU based tips and techniques"; Game Developers Conference—Mar. 20, 2006 Mar. 20, 52006); pp. 1-46.
Tuft: "Plane based depth bias for percentage closer filtering"; Game Developer—May 1, 2010 (May 1, 2010)—pp. 35-38.
Williams: "Casting curved shadows on curved surfaces"; In Proceedings of the 5th annual conference on Computer graphics and interactive techniques, SIGGRAPH '78, pp. 270-274, New York, NY, USA, 1978. ACM.
Bunnell et al: "Shadow Map Antialiasing"; GPU Gems, Addison Wesley Ed., 2004; Chapter 11, pp. 185-192.
Crow: "Shadow algorithms for computer graphics"; In proceedings of SIGGRAPH , 1977; pp. 242-248.
Stamminger et al: "Perspective Shadow Maps"; In proceedings of SIGGRAPH, 2002; pp. 1-6.
Wimmer et al: "Light Space Perspective Shadow Maps"; In proceedings of Eurographics Symposium on Rendering, 2004; pp. 1-9.
Hasseigren etal: "Conservative Rasterization"; In GPU Gems 2, M Pharr, Ed Addison Wesely; pp. 677-690.
Search Report dated Aug. 4, 2015.

* cited by examiner

METHOD AND DEVICE FOR ENRICHING THE CONTENT OF A DEPTH MAP

This application claims the benefit, under 35 U.S.C. § 365 of International Application PCT/EP2014/052396, filed Feb. 7, 2014, which was published in accordance with PCT Article 21(2) on Aug. 21, 2014 in English and which claims the benefit of European patent application No. 13305164.9 filed Feb. 12, 2013 and of European patent application No. 13305792.7 filed Jun. 12, 2013

1. DOMAIN OF THE INVENTION

The invention relates to the domain of depth map and more specifically to the enriching of the content of depth map(s). The invention is also understood in the context of Computer Generated Image (CGI or 3D-CGI).

2. PRIOR ART

According to the prior art, it is known to associate a depth map with an image representing a scene, the image being either a synthesis image representing a virtual scene or an image of a real scene shot by a camera. It is also known to use the depth information comprised in the depth map to perform visibility tests, i.e. to determine which fragment of the scene is hidden by another fragment of the scene according to a camera field of view. A depth map typically corresponds to an array of N lines and M columns of elements, also called pixels or texels, a single depth information being associated with each element of the depth map. The finite resolution of the depth map leads to some approximations when determining if a first fragment of the scene is hidden by (or in the shadow of) a second fragment of the scene, the depth of which with regard to the camera field of view being stored in an element (also called pixel or texel) of the depth map. The resulting aliasing is known as bias aliasing. This aliasing may particularly occur when the first and second fragments belong to the same surface of an object of the scene as viewed from the camera field of view associated with the depth map.

As to overcome at least partially this bias aliasing artifact, it is known to use a bias value that a fragment is considered occluded or in shadow when its distance to the camera field of view associated with the depth map is above the depth stored in an element of the depth map associated with this fragment plus the bias. However, the introduction of a bias value may lead to another aliasing known as peter-panning artifact.

3. SUMMARY OF THE INVENTION

The purpose of the invention is to overcome at least one of these disadvantages of the prior art.

More specifically, the purpose of the invention is to establish depth information associated with one or more elements of a depth map with a better precision than in the state of the art.

The invention relates to a method for enriching the content associated with a first element of a depth map, the depth map being associated with a scene according to a point of view. Thereafter, the method comprises a step of establishing at least a first information representative of a variation of depth in said first element in the space of the depth map.

According to a particular characteristic, the at least a first information is established from depth information associated with the first element and from depth information associated with at least a second element, the first element and the at least a second element belonging to a same surface element of the scene projected into the depth map.

Advantageously, the first element and the at least a second element are adjacent.

According to a specific characteristic, the at least a first information is established by computing the ratio of the difference of depth between the first element and the at least a second element to the distance between the first element and the at least a second element.

Advantageously, the at least a first information is established from an equation of a surface element of the scene projected into the space of a camera field of view associated with the depth map, the projected surface element comprising the first element.

According to another characteristic, the at least a first information is expressed under the form of a slope angle representative of the variation of depth in the first element.

Advantageously, the at least a first information expressed under the form of a slope angle is encoded in odd power function.

According to a particular characteristic, one first information is established for each dimension of the space of the depth map.

According to another characteristic, the method further comprises a step of storing the at least a first information associated with the first element in the depth map.

Advantageously, the content associated with the first element comprises a second information representative of the depth between the point of view and a fragment of the scene, the fragment corresponding to the closest fragment visible from the point of view along a viewing direction passing through the first element.

The invention also relates to a device configured for enriching the content associated with a first element of a depth map, the depth map being associated with a scene according to a point of view, the device comprising at least one processor configured for establishing at least a first information representative of a variation of depth in the first element in the space of the depth map.

Advantageously, the at least one processor is a Graphical Processor Unit (GPU).

According to a specific characteristic, the at least a first information is established from depth information associated with the first element and from depth information associated with at least a second element, the first element and the at least a second element belonging to a same surface element of the scene projected into the depth map.

According to another characteristic, the at least one processor is further configured for expressing the at least a first information under the form of a slope angle representative of the variation of depth in said first element and for encoding in odd power function the at least a first information expressed under the form of a slope angle.

The invention also relates to a computer program product comprising instructions of program code for execution by at least one processor to perform the method for enriching the content associated with a first element of a depth map, when the program is executed on a computer.

4. LIST OF FIGURES

The invention will be better understood, and other specific features and advantages will emerge upon reading the following description, the description making reference to the annexed drawings wherein.

Figure 1:
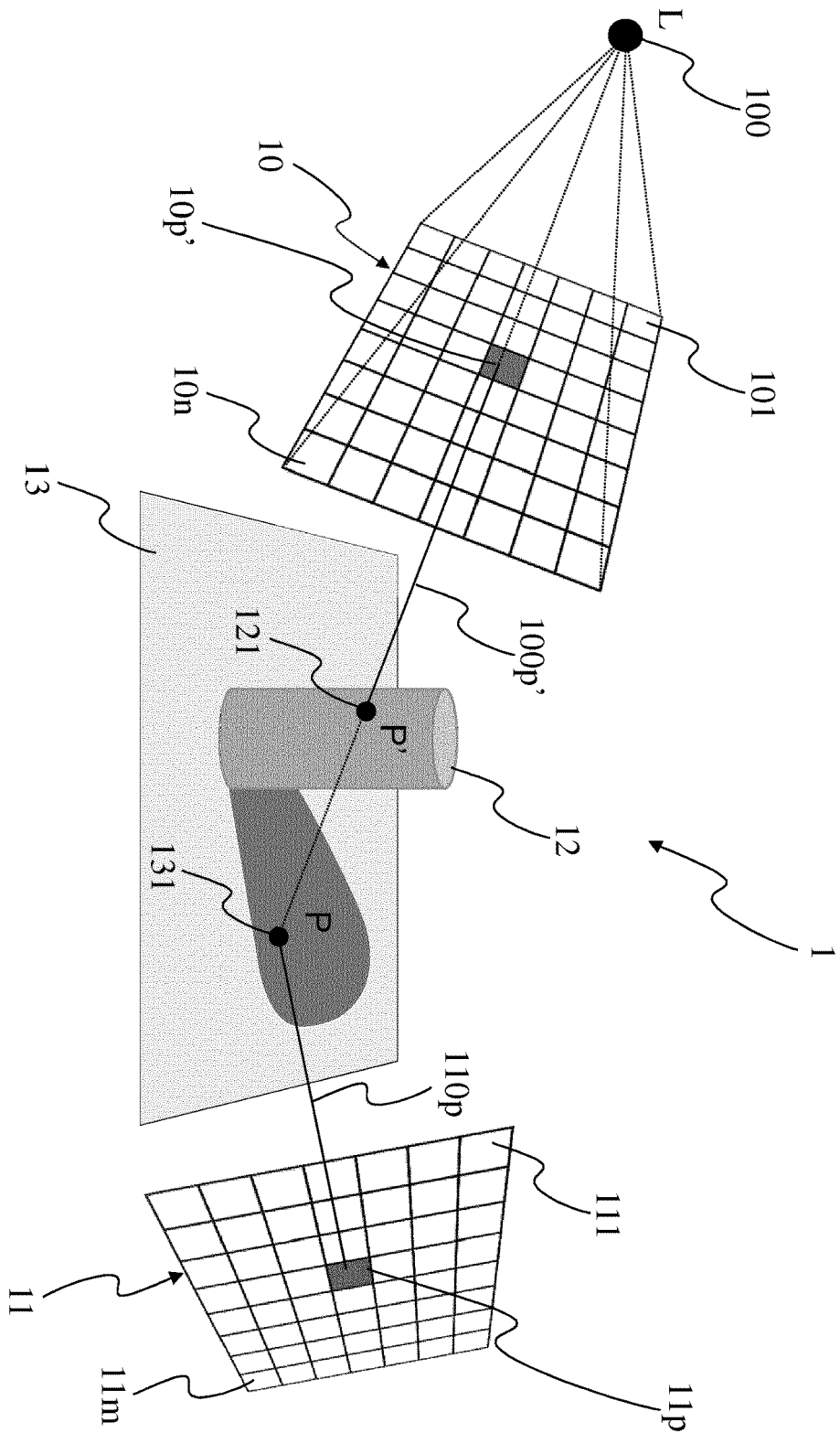
FIG. 1 shows an image and a depth map associated with a scene, according to the prior art.
Figure 7:
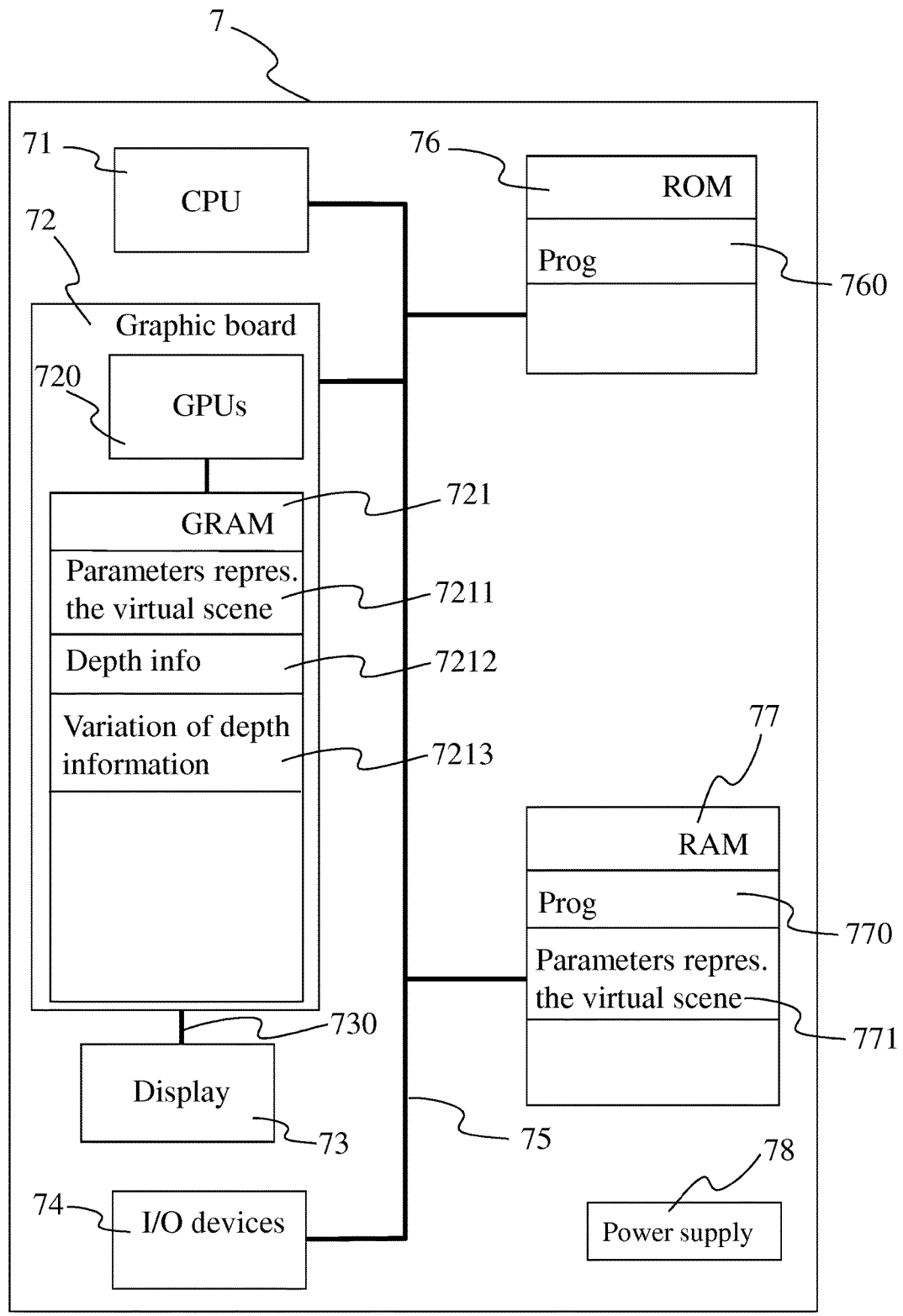
Figure 8:
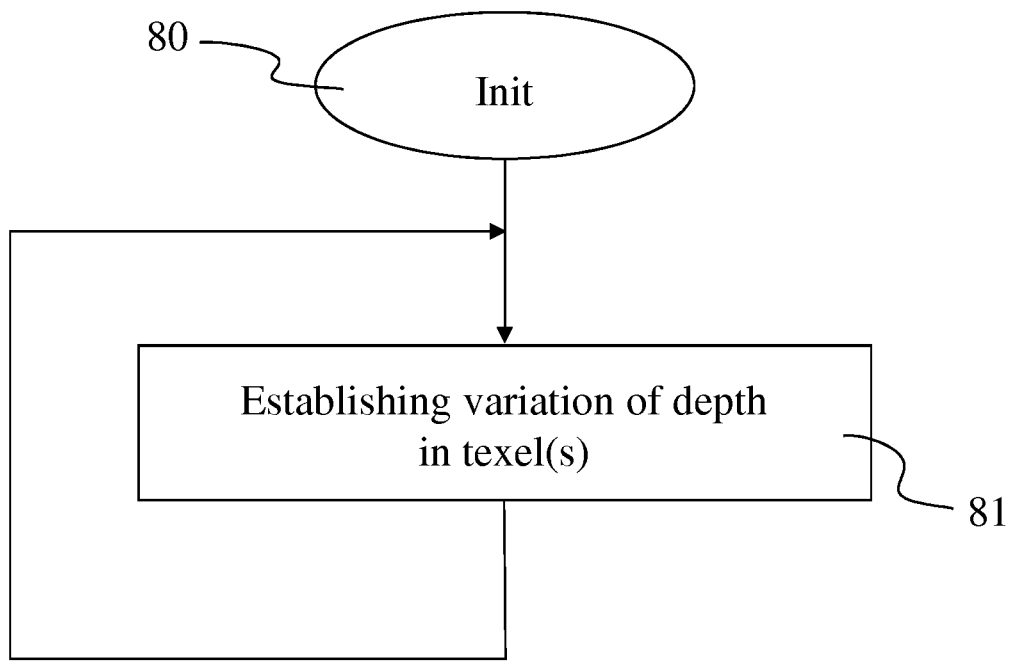

FIG. 7 diagrammatically shows a device implementing a method for enriching the content of the depth map of FIG. 1, according to a particular embodiment of the invention;

FIG. 8 shows a method for enriching the content of the depth map of FIG. 1, according to a particular embodiment of the invention.

5. DETAILED DESCRIPTION OF EMBODIMENTS OF THE INVENTION

The invention will be described in reference to a particular embodiment of a method for enriching the content of a first element of a depth map. The depth map advantageously corresponds to an array of L lines and M columns of elements, L and M being integers greater than 0, and is associated with a scene which is rendered in one or more images. The number of elements comprised in the depth map corresponds for example to the number of pixels of the image(s) of the scene. The depth map is advantageously enriched with one or more first information representative of the variation of depth in the first element in the space of the depth map.

The additional first information thus enables to retrieve, if needed, the depth associated with any point of the first element whereas, in depth map according to the prior art, the depth associated with any point of an element of a depth map is the same and corresponds to the depth of the closest visible fragment of the scene associated with the first element, or with its centre.

FIG. 1 shows a scene 1 rendered in an image 11 with an associated depth map 10, according to a particular and non-limitative embodiment. The image 11 represents the scene 1 as viewed from a given point of view (also called camera field of view, not represented on FIG. 1) and the depth map is generated according to another point of view 100 (i.e. another camera field of view). The scene corresponds for example to a virtual scene and comprises several virtual objects, i.e. a first object 12 and a second object 13. The objects 12 and 13 are modelled according to any method known to those skilled in the art, for example by polygonal modelling, in which the model is assimilated with a set of polygons (mesh elements) each defined by the list of summits and edges that compose it, by NURBS (Non uniform rational basic spline) type curve modelling in which the model is defined by a set of curves created via control vertices, by modelling by subdivision of surfaces. By virtual object is understood any virtual representation (obtained by modelling) of an object (real or fictitious) composing a real environment/real scene (for example the ground, a house or a house front, a person, a car, a tree, that is to say any element composing an environment such as a part of a house, a street, a town, the countryside, etc.) or an imaginary element. Each object 12, 13 of the scene 1 is characterized by a surface covering it, the surface of each object having reflectance properties (corresponding to the proportion of incident light reflected by the surface in one or several directions) that are specific to it.

The depth map 10 comprises n elements 101 ... $10p'$ ... $10n$, n being an integer greater than 0 that defines the resolution of the depth map 10, the resolution being for example equal to 512×512 pixels, 1024×1024 pixels or 4096×4096 pixels. A depth information is advantageously associated with each element of the depth map 10. This depth information corresponds to the distance between the point of view 100 and the closest visible fragment of the scene 1 along a viewing direction passing through an element of the depth map, this element of the depth map being associated with the closest visible fragment of the scene. By taking the element $10p'$ as an example, the depth information associated with this element $10p'$ corresponds to the distance between the point of view 100 and the fragment P' 121 of the scene 1 along the viewing direction $100p'$ having as origin the point of view 100 and passing through the element $10p'$, advantageously passing through the centre of the element $10p'$. The fragment P' 121 corresponds to the first element of the scene crossed by the viewing direction $100p'$ when starting from the point of view 100. The depth information is associated with the centre of the corresponding element of the depth map. A first information representative of the variation of depth inside an element of the depth map 10 is advantageously further associated with each element of the depth map, this first information being established as described with regard to FIGS. 2 to 4.

The image 11 comprises m pixels 111 ... $11p$ ... $11m$, m being an integer greater than 0 that defines the resolution of the image 11. Advantageously, m is different from n, for example n is greater than m or m is greater than n (the resolution of the depth map is for example 512×512 pixels, 1024×1024 pixels or 4096×4096 pixels whereas the resolution for the image 11 is for example 1024×768 pixels, 1280×720 pixels or 1920×1200 pixels). According to a variant, m is equal to n, both depth map 10 and image 11 having the same resolution. Attributes are advantageously associated with each pixel of the image 11, the attributes comprising for example color information (for example RGB information) and/or the translucent character of the fragment of the scene associated with a pixel of the image. A fragment advantageously corresponds to a surface element associated with a point of the scene 1, the size of which being equal to the size of a pixel of the image 11 that may be displayed to represent the scene 1 on a display screen. A fragment of the scene 1 becomes a pixel in the image if the fragment is visible from the point of view associated with the image 11. For clarity purpose, an element (for example a point) of the scene 1 will be called a fragment when positioning in the space of the 3D scene (the world space) and the same element visible from the point of view associated with the image 11 will be called pixel when positioning in the space of the image 11. A fragment visible from the point of view associated with the image 11 and the corresponding pixel in the image thus refers to one and a same element of the scene 1 and may be mixed up in the rest of the description. Advantageously the fragment is defined by a set of data grouping together one or several of the following data items:

the rasterization position of the fragment,
the depth of the fragment at the viewpoint,
attributes (for example the colour, the texture coordinates), the alpha channel representative of the translucent character of the fragment.

As to determine whether a fragment of the scene is visible from the point of view of the image 11, the well-known z-buffer method (also known as z-buffer algorithm) is used in association with one or more depth maps having the same point of view as the image 11 and having a structure similar to the depth map 10. The one or more depth maps having the same point of view as the image 11 and being used in the z-buffer algorithm are also called z-buffer(s). According to this method and by taking the pixel 11$p$ of the image 11 as an example, the depths of the fragments of the scene located along the viewing direction 110$p$ having as origin the point of view of the image 11 and passing through the centre of the pixel 11$p$ are compared, and the fragment P 131 having the smallest depth (i.e. the shortest distance from the point of view along the viewing direction 110$p$) is the one whose attributes are associated with the pixel 11$p$. According to a variant, the well-known painter's algorithm is used for solving the visibility problem as to determine which fragment of the scene is visible for each pixel of the image 11 from the point of view of the image 11.

According to the example of FIG. 1, the point of view 100 advantageously corresponds to the light source of the scene 1 and the depth map 10 is used to determine which fragment of the scene 1 is lit by the light source and which fragment of the scene is in shadow. According to this example, the depth map 10 may also be called a shadow map. Then, as to determine whether the fragment P 131 (corresponding to the pixel 11$p$ of the image 11) is lit or in the shadow of an object of the scene 1, the fragment P 131 is projected into the depth map along a viewing direction linking the point of view 100 and the fragment P 131. The distance $\|LP\|$ between the point of view 100 and the fragment P 131 is compared to the depth information $\|LP'\|$ associated with the centre of the element 10$p'$ corresponding to the projection of the fragment P 131 into the depth map 10. If $\|LP\|$ is greater than $\|LP'\|$, then the fragment P 131 is in the shadow of the fragment P' 121 (i.e. the fragment P 131 is not directly lit by the light source L). If $\|LP\|$ is less than or equal to $\|LP'\|$, then the fragment P 131 is directly lit by the light source L. In an advantageous way, the depth information with which the distance $\|LP\|$ is compared is retrieved from the depth information associated with the centre of the element 10$p'$ and from the first information representing the variation of depth inside the element 10$p'$. This enables to determine with a better precision whether the fragment P 131 is lit or not by another fragment of the scene, especially when the projection point of the fragment P' 131 into the depth map does not coincide with the centre of the element 10$p'$ while belonging to the element 10$p'$. This enables to correct some defects related to the finite resolution of the depth map 10. Determining whether a fragment if lit enables to associate video information (e.g. RGB data) with the considered fragment in harmony with the character lit or not lit of the fragment when rendering the scene in the image 11, i.e. when rendering the pixels of the image 11 associated with the considered fragment. The rendering of the pixels of the image is then more precise with less or no artefact when compared to rendering method using depth maps of the prior art.

According to a variant, the scene 1 is a real scene shot by a camera device generating the image 11 and advantageously one or more other images according to different points of view as to generate a stereoscopic image of the scene. According to this variant, a depth map is generated according to the same point of view as the image 11, the depth map and the image 11 being associated with each other. Depth maps associated with the other images of the scene may also be generated. The depth information associated with the centre(s) of the element(s) of the depth map is for example generated via a depth sensor associated with the camera. According to another example, the depth map is generated by comparing two images of the scene 1 acquired according to two different points of view (for example a left image and a right image of the scene), a disparity information being retrieved by comparing on a pixel basis the two images for making a match between the pixels of each view by pairs of two, the disparity information corresponding to the difference in pixels according to the horizontal axis between the location of a pixel in the left image and the location of its corresponding pixel in the right image. The depth map according to this example is called a disparity map. The disparity map associated with the image 11 is representative of the disparity between image 11 (corresponding for example to a left image of a stereoscopic image) and another image of the stereoscopic image (for example the right image), another disparity map may be associated with the right image, this another disparity map being representative of the disparity between the right image and the left image 11. Each disparity map is advantageously estimated by comparison and pairing of the pixels of the left image 11 (respectively right image) to the pixels of the right image (respectively left image 11). The disparity associated with a pixel of the left image 11 (respectively right image) advantageously corresponds to the pixel distance between this pixel of the left image 11 (respectively right image) and the corresponding (or paired) pixel of right image (respectively left image 11), that is to say, the pixel of the right image (respectively left image 11) having video information (that is to say, color information) identical or similar to that of the pixel of left image 11 (respectively right image). The first information representative of the variation of depth is established and associated with the elements of the depth map 10 (disparity map) as it will described with more details with regard to FIGS. 2 to 4.

Figure 2:
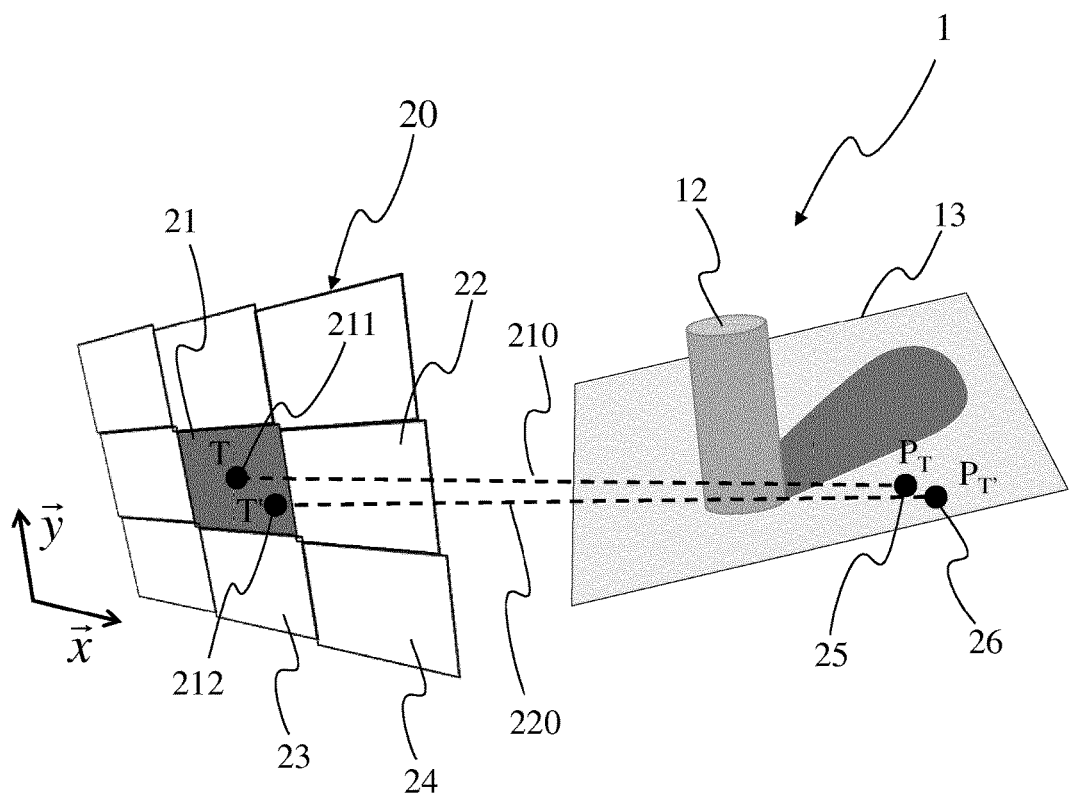
FIG. 2 shows a part of the depth map of FIG. 1, according to a particular embodiment of the invention.

FIG. 2 shows a part 20 of the depth map 10 of FIG. 1, according to a particular and non-limitative embodiment. This part of the depth map is centred on a first element 21, which is surrounded by 8 elements of the depth map 10, among them the elements 22, 23 and 24, called second elements. A depth information $p_{z,21}$ representative of the distance between the point of view 100 (not represented on FIG. 2) and the fragment $P_T$ 25 is associated with the centre T 211 of the first element 21. The point T 211 of the first element corresponds to the projection point of the fragment $P_T$ 25 along the viewing direction 210 which passes through the first element 21. The point T' 212, which belongs to the first element 21, corresponds to the projection point of the fragment $P_{T'}$ 26 along the viewing direction 220 having as origin the point of view 100 associated with the depth map 10 and passing through the first element 21. The first fragment 25 and the second fragment are advantageously close to each other (for example adjacent) and belongs to the same surface of an object of the scene, i.e. the surface of the object 13 which is lit by the light source L (not represented on FIG. 2) corresponding to the point of view 100 associated with the depth map 10. As to determine whether the fragment $P_{T'}$ 26 is lit, the depth of the fragment $P_{T'}$ 26 according to the point of view 100 is compared with the depth information associated with the point T' 212, which is computed by using the depth information associated with the first element 21 (or with the centre T 211 of the first element 21) and the one or more first information representative of the variation of depth in the first element 21 that is (are) associated with the first element 21. With the depth maps of the prior art, the depth of the fragment $P_{T'}$ 24 would have only been compared with the depth information $p_{z,21}$ associated with the centre T 211 of the first element 21, which may have led to visible artefacts. Indeed, by considering that the surface of the object 13 to which the two fragments 25 and 26 belong is nearly tangent to the viewing directions 210 and 220 of the first and second fragments (or in another words, the angle formed by the surface normal of the object 13 and by one viewing direction 210 or 220 is high, i.e. greater than a predetermined threshold angle, for example greater than 45°), the comparison of the distance $\|LP_T\|$ with the depth associated with the centre T 211 of the first element 21 (and which actually corresponds to the distance $p_{z,21} = \|LP_T\|$) could establish that the second fragment $P_{T'}$ 26 is in the shadow of the first fragment $P_T$ 25, especially when the second fragment $P_{T'}$ 26 is behind the first fragment $P_T$ 25 with regard to the point of view, or when the second fragment $P_{T'}$ 26 is located further from the first fragment $P_T$ 25 with regard to the point of view. This is of course an erroneous consideration due to the imprecision of the depth information stored in depth map of the state of the art that do not comprise the first information established as it will described with regards to FIGS. 3A, 3B, 4 and 5. Indeed, both fragments $P_T$ 25 and $P_{T'}$ 26 are lit by the light source L (or visible from the point of view 100) as they belong to one and same surface of the object 13 and as their projection points T 211 and T' 212 in the depth map belong to the same first element 21.

Figure 3A:
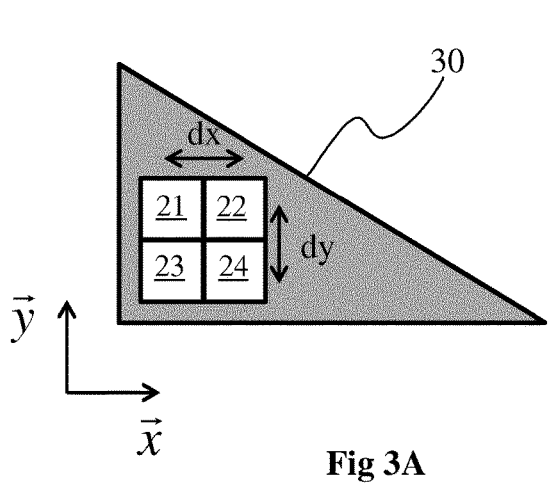
FIGS. 3A, 3B and 4 show the projection of a surface element of the scene of FIG. 1 projected onto the depth map of FIG. 1, according to two particular embodiments of the invention.
Figure 3B:
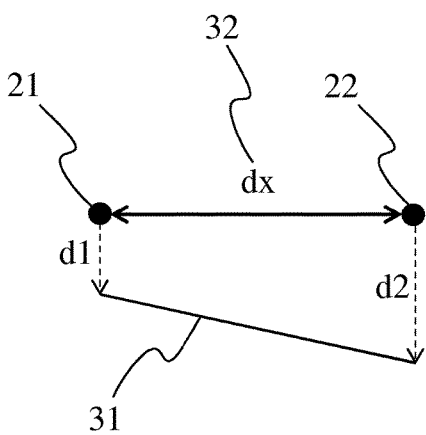

FIGS. 3A and 3B show a first method to establish the one or more first information representative of the variation of depth in the first element 21, according to a particular and non-limitative embodiment of the present principles. Common elements of FIGS. 2 and 3A and 3B have the same reference numbers. FIG. 3A illustrates a first surface element 30 which corresponds to the projection of a second surface element belonging to the scene 1, the second surface element corresponding for example to a mesh element (a polygon, for example a triangle) if the scene has been modelled by polygonal modelling or to a subdivision of a surface if the scene 1 has been modelled by subdivision of surfaces. According to the example of FIG. 3, the first surface element takes the form of a triangle and is defined in the space (x, y) of depth map 10. The first surface element 30 comprises at least 4 elements 21, 22, 23, 24 forming a 2×2 square of elements. The element 21 corresponds to the first element 21 of FIG. 2, the elements 22, 23 and 24 being called second elements. dx represents the distance between the centre of the first element 21 and the centre of the second element 22 along the horizontal axis x, in the space (x, y) of the depth map. dy represents the distance between the centre of the first element 21 and the centre of the second element 23 along the vertical axis y, in the space (x, y) of the depth map. The first information representative of the variation of depth in the first element 21 in the space (x, y) of the depth map is advantageously established (i.e. computed or generated) during the rasterization process (which enables to determine which fragments of the scene 1 are part of the second surface elements of the scene 1 and thus of the corresponding first surface elements of the depth map) of the first surface element 30 in the depth map, the rasterization process being performed by the geometry shader of a graphics hardware pipeline associated with a GPU (Graphics Processing Unit) as described hereinafter with respect to FIG. 5. The first information representative of the variation of depth in the first element along the x axis is established from the depth information associated with the centre of the first element 21 and from the depth information associated with the centre of the second element 22, which is advantageously adjacent to the first element 21 along the x axis, by taking into account the distance dx separating the centre of the first element 21 and the centre of the second element 22 along the x axis. FIG. 3B illustrates the first element 21 and the second element 22 and the depth information d1 and d2 associated with their respective centres. d1 and d2 are represented with dashed arrows, the depth difference between the first element 21 and the second element 22 being represented with a line segment 31, the distance dx 32 between the centres of respectively the first element 21 and the second element 22 being represented by a double arrow. The first information representative of the variation of depth in the first element 21 corresponds to the slope of this line segment 31, which is obtained by establishing the partial derivative of the function of the straight line 31.

The first information representative of the variation of depth in the first element in the space of the depth map along the x axis may be established with the following equation:

$$\frac{dp_{z,21}}{dx} = \frac{p(21-dx) - p(21)}{dx} = \frac{p(22) - p(21)}{dx} \qquad \text{equation 1}$$

with $$\frac{dp_{z,21}}{dx}$$

corresponding to the first information along the x axis associated with the first element 21, also corresponding to the partial depth derivative along the x axis, p(21) corresponding to the depth information associated with the centre T 211 of the first element 21, p(21−dx)=p(22) corresponding to the depth information associated with the centre of the second element 22.

In a same way, a first information representative of the variation of depth in the first element along the y axis is established from the depth information associated with the centre of the first element 21 and from the depth information associated with the centre of the second element 23, which is advantageously adjacent to the first element 21 along the y axis, by taking into account the distance dy separating the centre T 211 of the first element 21 and the centre of the second element 23 along the y axis. The first information representative of the variation of depth in the first element 21 in the space of the depth map along the y axis may be established with the following equation:

$$\frac{dp_{z,21}}{dy} = \frac{p(21-dy) - p(21)}{dy} = \frac{p(23) - p(21)}{dy} \qquad \text{equation 2}$$

with $$\frac{dp_{z,21}}{dy}$$

corresponding to the first information associated with the first element 21 along the y axis, also corresponding to the partial depth derivative along the y axis, p(21) the depth information associated with the centre T 211 of the first element 21, p(21−dy)=p(23) corresponding to the depth information associated with the centre of the second element 23.

According to a variant, only one of the two first information (either along the x axis or along the y axis) is established as to minimize the computation amount performed in the rendering pipeline of the GPU.

The first information associated with the other elements 22, 23 and 24 is advantageously established with the same group of elements 21 to 24. For example, the first information $$\frac{dp_{z,22}}{dx}$$

a representative of the variation of depth in the element 22 along the x axis is established from the depth information p(22) associated with the centre of the element 22 and from the depth information p(21) associated with the centre T 211 of the element 21, by taking into account the distance dx 32 separating the centre of the element 22 and the centre of the element 21. The first information $$\frac{dp_{z,22}}{dy}$$

representative of the variation of depth in the element 22 along the y axis is established from the depth information p(22) associated with the centre of the element 22 and from the depth information p(24) associated with the centre of the element 24, by taking into account the distance dy separating the centre of the element 22 and the centre of the element 24. Both first information (along the x axis and the y axis respectively) may be established via the following equations:

$$\frac{dp_{z,22}}{dx} = \frac{p(22) - p(22 - dx)}{dx} = \frac{p(22) - p(21)}{dx} \qquad \text{equation 3}$$

$$\frac{dp_{z,22}}{dy} = \frac{p(22 - dy) - p(22)}{dy} = \frac{p(24) - p(22)}{dy} \qquad \text{equation 4}$$

Figure 4:
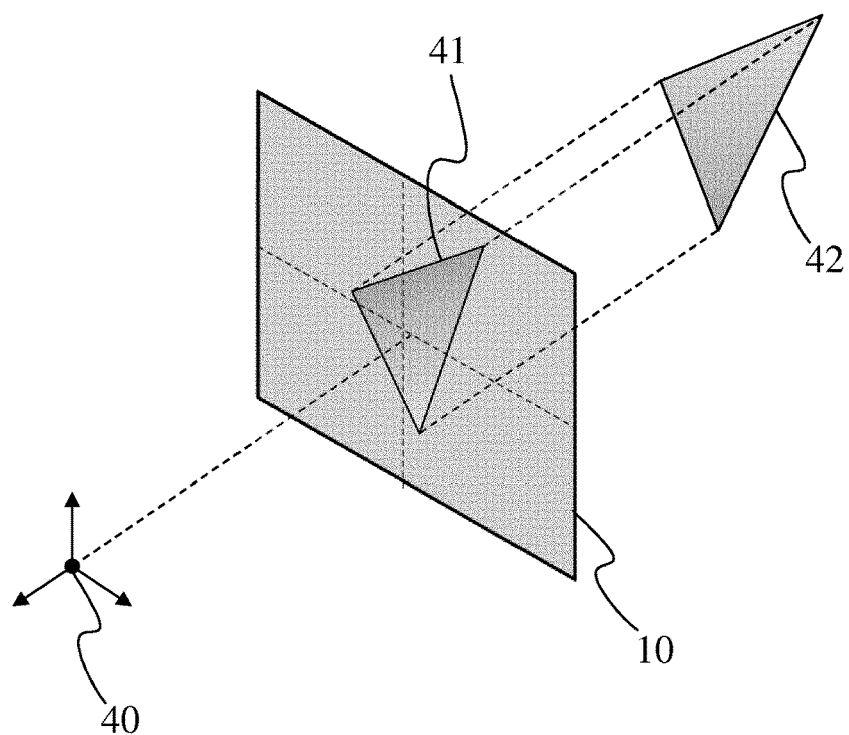

FIG. 4 show a second method to establish the one or more first information representative of the variation of depth in the first element 21 of FIG. 2, according to a particular and non-limitative embodiment. FIG. 4 illustrates a first surface element 41 which corresponds to the projection of a second surface element 42 belonging to the scene 1, the second surface element corresponding for example to a mesh element (a polygon, for example a triangle) if the scene has been modelled by polygonal modelling or to a subdivision of a surface if the scene 1 has been modelled by subdivision of surfaces. The second surface element 42 is represented in the world space, i.e. the space of the scene 1. The first surface element 41 corresponds to the projection of the second surface element 42 in the tri-dimensional space 40 associated with an orthographic camera associated with the depth map 10. Using an orthographic camera enables to project the second surface element, which belong to the world space, into a tri-dimensional space (x, y, z) of the camera field of view associated with the depth map 10. As to establish the one or more first information representative of the variation of depth in a first element of the depth map in the 2D-space of the depth map 10, the function representative of the plane associated with the first surface element 41 in the 3D space of the orthographic camera 40 is determined and is as follow:

$$ax+by+cz+d=0 \qquad \text{equation 5}$$

with a, b, c and d the plane factors, x, y and z being the coordinates of points of the plane, z corresponding to the depth.

$$z = \frac{-(ax + by + d)}{c} \qquad \text{equation 6}$$

which enables to establish the first information ($dp_{z,21}/dx$) along the x axis of the space of the depth map and/or the first information ($dp_{z,22}/dy$) along the y axis of the space of the depth map:

$$\frac{dp_{z,21}}{dx} = -\frac{a}{c} \qquad \text{equation 7}$$

$$\frac{dp_{z,22}}{dy} = -\frac{b}{c} \qquad \text{equation 8}$$

Figure 5:
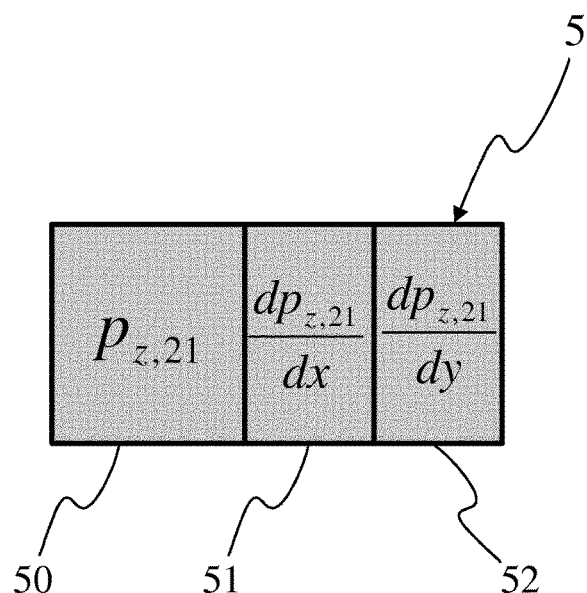
FIG. 5 shows depth information stored in an element of the depth map of FIG. 1, according to a particular embodiment of the invention.

FIG. 5 diagrammatically illustrates the structure 5 of a memory element (or combination of memory elements) that represents the first element 21 of the depth map 10, according to a particular and non limitative embodiment of the present principles. The structure 5 comprises 3 memory blocks 50, 51, 52. The depth information $p_{z,21}$ associated with the centre of the first element is stored in the first block 50, the first information $dp_{z,21}/dx$ representative of the variation of depth along the x axis of the space of the depth map is stored in the second block 51 and the first information $dp_{z,21}/dy$ representative of the variation of depth along the y axis of the space of the depth map is stored in the third block 52. The structure of the depth map is for example a 32-bits RGBA buffer, 16 bits being used for the block 50, 8 bits for the second block 51 and 8 bits for the third block 52. According to another example, the structure of the depth map is a 64-bits data array stored in a RGBA buffer with 32 bits for the first block 50 and 16 bits for each block 51 and 52. If only one first information is established (either along axis x or axis y), one of the block 51 and 52 is empty and the freed space memory may be used for storing the only one first information with more precision.

The first information stored in the depth map 10 and associated with the first element 21 of FIG. 2 may then be used for computing the depth information associated with the point T' 212 of the first element 21. The depth information $p_{z,T'}$ associated with point T' 212 is computed with the following equation:

$$p_{z,T'} = p_T + (x_{T'} - x_T)\frac{dp_{z,21}}{dx} + (y_{T'} - y_T)\frac{dp_{z,21}}{dy} \qquad \text{equation 9}$$

with $P_T=P_{z,21}$ the depth information associated with the centre T 211 of the first element 21, $x_{T'}$ and $y_{T'}$ the coordinated of the point T' 212 in the space (x, y) of the depth map 10, $x_T$ and $y_T$ the coordinated of the point T 211 in the space (x, y) of the depth map 10, $$\frac{dp_{z,21}}{dx}$$

the first information representative of the variation of depth in the first element 21 along the x axis, $$\frac{dp_{z,21}}{dy}$$

the first information representative of the variation of depth in the first element 21 along the y axis.

As to determine whether the fragment $P_{T'}$ 26 is lit or hidden from the light by the fragment $P_T$ 25, the distance $\|LP_{T'}\|$ between the point of view 100 and the fragment $P_{T'}$ 26 is compared with the depth information $p_{z,T'}$ associated with the point T' 212 and computed via the equation 9. If $\|LP_{T'}\|$ is less than or equal to $p_{z,T'}$ then the fragment $P_{T'}$ 26 is lit by the light source L 100 (not illustrated on FIG. 2 but illustrated on FIG. 1). If $\|LP_{T'}\|$ is greater than $p_{z,T'}$ then the fragment $P_{T'}$ 26 is not lit by the light source L 100.

Figure 6A:
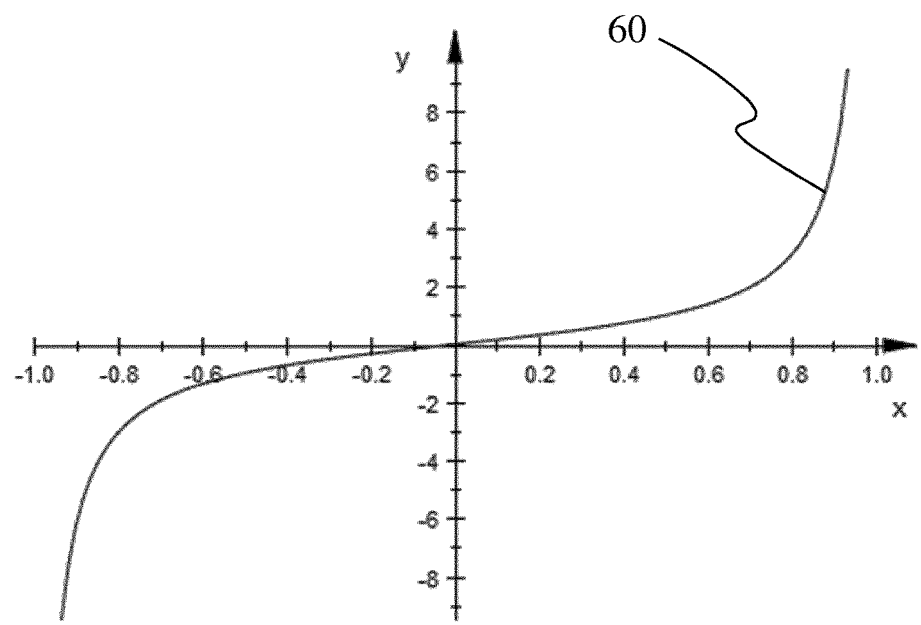
FIGS. 6A and 6B illustrate the encoding of depth information comprised in the depth map of FIG. 1, according to a particular embodiment of the invention.
Figure 6B:
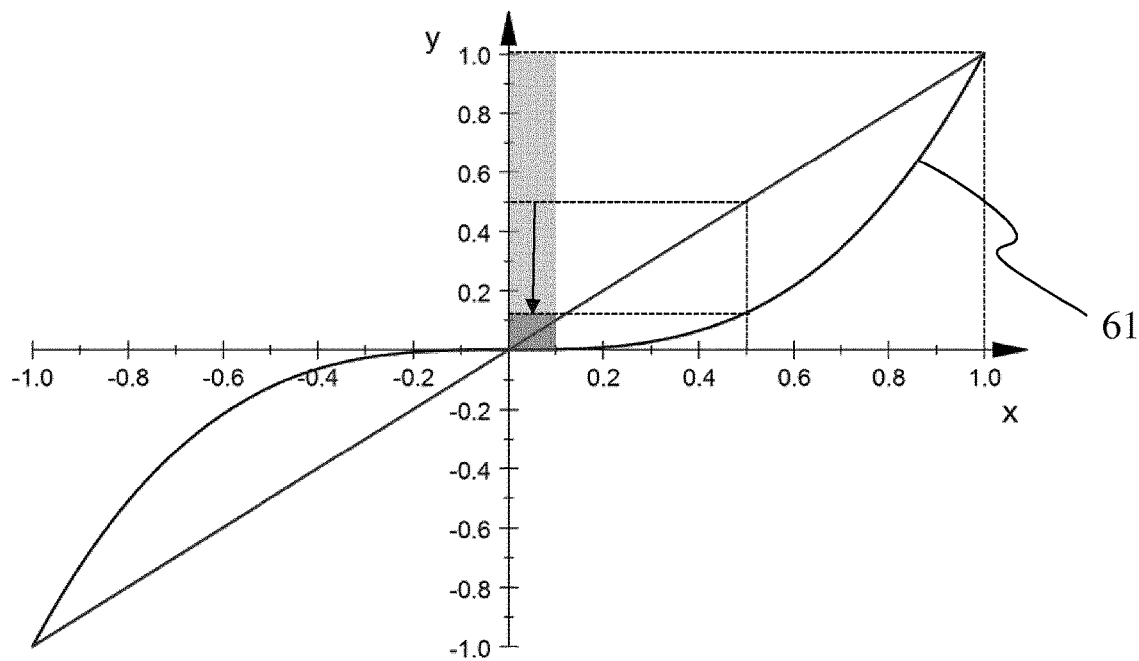

FIGS. 6A and 6B illustrate the encoding of the first information representative of the variation of depth in the first element 21 of the depth map 10, according to a particular and non-limitative embodiment. Values of the first information representative of the variation of depth in a first element of a depth map may be significantly small in presence of front facing surfaces (i.e. surfaces of object(s) having a normal parallel or roughly parallel with the viewing direction passing through the center of the first element 21 of the depth map) and conversely very large in presence of grazing angle surfaces (i.e. surfaces of object(s) of the scene having a normal perpendicular or roughly perpendicular to the normal of the depth map). Such amplitude requires high precision float storage and may significantly increase the depth map storage. On the other hand, as the first information represents slopes of linear function of x (along x axis of the depth map) and y (along y axis of the depth map), it may be represented by slope angles as follow:

$$\theta_x(p_{z,21}) = \arctan\left(\frac{dp_{z,21}}{dx}\right) \qquad \text{equation 10}$$

$$\theta_y(p_{z,21}) = \arctan\left(\frac{dp_{z,21}}{dy}\right) \qquad \text{equation 11}$$

These angular functions are defined in the boundary range $$[-\frac{\pi}{2}, \frac{\pi}{2}]$$

and may be stored in an unsigned 8 bits integer values for example, with a precision of $$\frac{\pi}{256},$$

i.e approximately 0.703 degrees.). FIG. 4A shows such a angular function 60, the range $$[-\frac{\pi}{2}, \frac{\pi}{2}]$$

being [−1.0; 1.0]. It may be observed in FIG. 6A that for low angles, the first information values (i.e. the derivative or rate) vary slowly and the angular precision is not critical. Conversely it becomes critical near domain bounds, i.e. near $$-\frac{\pi}{2} \text{ and } \frac{\pi}{2}.$$

A small angular variation represent high derivative variation that may lead to erroneous depth reconstruction. Having higher precision may require an increasing data storage of 16 or 32 bits size for instance. According to one specific and non-limitative embodiment of the invention, the angular functions representative of the variation of depth in a first element of the depth map in the space of the depth map along axis x and y, i.e. the functions $\theta_x(p_{z,21})$ and $\theta_y(p_{z,21})$, are encoded in odd power functions $x^y$ (for example $x^3$ or $x^5$) in order to compress the angular domain around 0 and give higher precision for area near the domain bounds, i.e. near $$-\frac{\pi}{2} \text{ and } \frac{\pi}{2}.$$

Such function 61 and effective compression is showed in FIG. 6B with an odd power function (FIG. 6B illustrating a normalized angular domain compression using odd power function (i.e. $x^3$ in the example of FIG. 6B)). Such an embodiment allows to record the first information (i.e. the derivatives) with a good precision with an only 8 bits data storage for each first information value. The final encoded first information values $E_{dx}(p_{z,21})$ and $E_{dy}(p_{z,21})$ (along the x axis and the y axis respectively) in an unsigned 8 bits integer are obtained as follow:

$$E_{dx}(p_{z,21}) = \left(0.5 + 0.5\left(\frac{2 \times \theta_x(p_{z,21})}{\pi}\right)^n\right) \times 255 \qquad \text{equation 12}$$

$$E_{dy}(p_{z,21}) = \left(0.5 + 0.5\left(\frac{2 \times \theta_y(p_{z,21})}{\pi}\right)^n\right) \times 255 \qquad \text{equation 13}$$

with n representing a positive odd integer.

The decoding as to obtain the first information values is advantageously performed in scene rendering pass where depth comparison takes place as to determine whether a fragment is lit (or whether a fragment is visible). Decoded first information values $$\frac{dp_{z,21}}{dx} \text{ and } \frac{dp_{z,21}}{dy}$$

are obtained as follow:

$$\frac{dp_{z,21}}{dx} = \tan\left(\frac{\pi}{2} \times \left(2 \times \frac{E_{dx}(p_{z,21})}{255} - 1\right)^{\frac{1}{n}}\right) \qquad \text{equation 14}$$

-continued $$\frac{dp_{z,21}}{dy} = \tan\left(\frac{\pi}{2} \times \left(2 \times \frac{E_{dy}(p_{z,21})}{255} - 1\right)^{\frac{1}{n}}\right) \quad \text{equation 15}$$

FIG. 7 diagrammatically shows a hardware embodiment of a device 7 configured for enriching the content associated with a first element of a depth map. The device 7 is also configured for the creation of display signals of one or several synthesis images representative of the scene 1. The device 7 corresponds for example to a personal computer (PC), a laptop, a tablet, a Smartphone or a games console.

The device 7 comprises the following elements, connected to each other by a bus 75 of addresses and data that also transports a clock signal:
- a microprocessor 71 (or CPU),
- a graphics card 72 comprising:
  - several Graphical Processor Units (or GPUs) 720,
  - a Graphical Random Access Memory (GRAM) 721,
- a non-volatile memory of ROM (Read Only Memory) type 76,
- a Random Access Memory or RAM 77,
- one or several I/O (Input/Output) devices 74 such as for example a keyboard, a mouse, a webcam, and
- a power source 78.

The device 7 also comprises a display device 73 of display screen type directly connected to the graphics card 72 to display synthesized images calculated and composed in the graphics card, for example live. The use of a dedicated bus to connect the display device 73 to the graphics card 72 offers the advantage of having much greater data transmission bitrates and thus reducing the latency time for the displaying of images composed by the graphics card. According to a variant, a display device is external to the device 7 and is connected to the device 7 by a cable or wirelessly for transmitting the display signals. The device 7, for example the graphics card 72, comprises an interface for transmission or connection (not shown in FIG. 7) adapted to transmit a display signal to an external display means such as for example an LCD or plasma screen or a video-projector.

It is noted that the word "register" used in the description of memories 721, 76, and 77 designates in each of the memories mentioned, both a memory zone of low capacity (some binary data) as well as a memory zone of large capacity (enabling a whole program to be stored or all or part of the data representative of data calculated or to be displayed).

When switched-on, the microprocessor 71 loads and executes the instructions of the program contained in the RAM 77.

The random access memory 77 notably comprises:
in a register 770, the operating program of the microprocessor 71 responsible for switching on the device 7,
parameters 771 representative of the scene (for example modelling parameters of the object(s) of the scene, lighting parameters of the scene.).

The algorithms implementing the steps of the method specific to the invention and described hereafter are stored in the memory GRAM 721 of the graphics card 72 associated with the device 7 implementing these steps. When switched on and once the parameters 771 representative of the environment are loaded into the RAM 77, the graphic processors 720 of the graphics card 72 load these parameters into the GRAM 721 and execute the instructions of these algorithms in the form of microprograms of "shader" type using HLSL (High Level Shader Language) language or GLSL (OpenGL Shading Language) for example.

The random access memory GRAM 421 notably comprises:
in a register 7211, the parameters representative of the scene,
in a register 7212, the depth information associated with the centres of the elements of the depth map,
in a register 7213, the one or two first information representative of the variation of depth in an element of the depth map in the space of the depth map.

According to a variant, the first and second identifiers and the distances are stored in the RAM 77 and processed by the microprocessor 71.

According to another variant, a part of the RAM 77 is assigned by the CPU 71 for storage of the identifiers and the distances if the memory storage space available in GRAM 721 is insufficient. This variant however causes greater latency time in the composition of an image comprising a representation of the environment composed from microprograms contained in the GPUs as the data must be transmitted from the graphics card to the random access memory 77 passing by the bus 75 for which the transmission capacities are generally inferior to those available in the graphics card for transmission of data from the GPUs to the GRAM and vice-versa.

According to another variant, the power supply 78 is external to the device 7.

FIG. 8 shows a method for enriching the content associated with a first element of a depth map implemented for example in a device 7, according to a first non-restrictive particularly advantageous embodiment of the invention.

During an initialisation step 80, the different parameters of the device 7 are updated. In particular, the parameters representative of the scene 1 represented in the image 11 as well as the depth information comprised in the depth map 10 are initialised in any way. Then during a step 81, at least a first information representative of the variation of the depth in a first element (for example a texel or a pixel) of a depth map is established in the space of the depth map. The first information is used for enriching the content of depth map of the state of the art which only comprises one depth information (called second information representative of the depth), associated with the centre of the first element, corresponding to the depth of the fragment of the scene that is visible from the point of view associated with the depth map along a viewing direction having as origin the point of view of the depth map and passing through the first element. In an advantageous way, two first information are established, i.e. one first information representative of the variation of the depth along the horizontal axis of the space of the depth map and another first information representative of the variation of the depth along the vertical axis (which is perpendicular to the horizontal axis) of the space of the depth map. According to a variant, only one of the two first information is established, either the first information representative of the variation of the depth along the horizontal axis of the space of the depth map or the first information representative of the variation of the depth along the vertical axis of the space of the depth map. The first information is advantageously used in addition to the depth information associated with the centre of the centre of the first element to establish the depth information associated with any point of the first element, using the coordinates of this point expressed in the space of the depth map, instead of associated the depth information of the centre of the first element with any point of the first element as it is done according to the state of the art.

The first information is for example established from the depth information associated with the centre of the first element and with the depth information associated with the centre of a second element of the depth map. The first and second elements belongs to a same surface element resulting from the projection of a surface element of the scene into the depth map. The first and second elements used to establish the first information representative of the variation of the depth along the horizontal axis of the space of the depth map are advantageously adjacent along the horizontal axis. The first and second elements used to establish the first information representative of the variation of the depth along the vertical axis of the space of the depth map are advantageously adjacent along the vertical axis. The first information advantageously corresponds to the ratio of the difference of depth between the first element and the second element to the distance between the first element and the second element (for example to the distance between the centre of the first element and the centre of the second element).

According to another example, the first information is established by using the equation of a surface element comprising the first element and obtained by projecting a surface element of the scene into the space of a camera field of view associated with the depth map. The first information corresponds to the slope(s) of this surface element, the equation of which being expressed in the space of the camera field of view of the depth map, with regard to the horizontal axis and/or vertical axis of the space of the depth map.

According to a variant, the one or two first information is expressed under the form of a slope angle representing the variation of the depth in the first element.

According to another variant, this (these) angular representation(s) of the first information is (are) encoded in odd power function.

According to a further variant, the first information is stored in a buffer associated with the depth map, in association with the first element.

According to another variant, an image of the scene is rendered by displaying pixels associated with fragments of the scene which are visible from the point of view (i.e. the camera field of view) associated with the image. The color information (e.g. RGB information) associated with the displayed pixels of the image corresponds to the color information associated with the fragments associated with the pixels of the image. The depth of a fragment associated with a pixel of the image is advantageously compared to the depth associated with the point of projection of the fragment into the depth map associated with the scene along a viewing direction having as origin the point of view of the depth map and as end the considered fragment, the depth associated with the point of projection being retrieved from the first information and the second information associated with the element of the depth map comprising the point of projection. This comparison enables to determine whether the considered fragment is lit (when the light source of the scene corresponds to the point of view of the depth map), which may have an impact on the color information associated with the fragment and thus on the color information associated with the pixel of the image to be rendered.

The step 81 is advantageously reiterated for each element of the depth map and for each depth map associated with any image of the scene.

Naturally, the invention is not limited to the embodiments previously described.

In particular, the invention is not limited to a method for enriching the content of a depth map but also extends to any device implementing this method and notably any devices comprising at least one GPU. The implementation of calculations necessary to the generation of elementary geometries, to the determination of index values to be assigned to the elementary geometries is not limited either to an implementation in shader type microprograms but also extends to an implementation in any program type, for example programs that can be executed by a CPU type microprocessor.

The use of the invention is not limited to a live utilisation but also extends to any other utilisation, for example for processing known as postproduction processing in a recording studio for the display of synthesis images for example.

The invention also relates to a method (and a device configured) for encoding depth information representative of the variation of depth in an element of a depth map in the space of the depth map. The invention further relates to a method and device for determining the depth information associated with a point of a first element of depth map based on the depth information associated with the centre of the first element and on the additional depth information representative of the variation of the depth along the horizontal and/or vertical axis of the depth map.

Advantage is taken of the programmable rendering pipeline present in GPU (Graphic Processor Unit) to encode the first information (also called derivatives) in a first pass (shadow map rendering), decode them in a second pass (scene rendering) and use them to perform the depth comparison. The GPU implementation for a whole process combining several embodiments of the invention works as follow:

1. A first pass renders the scene from the light view in for example one 32 bits render target (1 or 2 components) representing the depth/shadow map;
2. At vertex processing stage, a vertex shader is set up to transform mesh element (e.g. triangle) vertex from object space to light clip space.
3. At fragment processing stage, a fragment shader is setup. The fragment's depth $p_z$ is obtained in light clip space (i.e. the space of the depth/shadow map) for the texel being rasterized. $p_z$ is written in the higher 16 bits of the 32 bits final value.
4. The first information (the depth derivatives $$\left(\text{the depth derivatives } \frac{dp_z}{dx} \text{ and } \frac{dp_z}{dy}\right)$$

is computed. Depth derivatives are either computed from a surface (for example a triangle) plane equation or directly obtained from the derivative function available in most GPUs (dFdx(OpenGL) or ddx(DirectX)). They are then encoded in the final value in the 2 lower 8 bits of the depth buffer. The final value is written in the depth/shadow map.
5. A second pass renders the scene from the camera view. The depth/shadow map is bind to a GPU texture unit.
6. At fragment processing stage, a fragment shader is setup. The view sample P is projected in light space (space of the depth/shadow map) giving its depth $p_z$ in clip space, its projection location in shadow map space $(p_x, p_y)$ and the texel (i, j) where it belongs to.

7. A texture lookup is performed in the shadow map to retrieve the stored value. The higher 16 bits is read to retrieve $p_z$ and $dp_z/dx$ and $dp_z/dy$ from the 2 lower 8 bits value.
8. The depth dz of occluder that coincides with P projection is then retrieved.
9. If dz<pz then P is shadowed. It is unshadowed otherwise. Test result is either written in a shadow buffer for later used (deffered) or combine with surface lighting in the same fragment shader;

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The present invention may be used in video game applications for example, whether via programs that can be executed in a PC or portable type computer or in specialised game consoles producing and displaying images live. The device 7 described with respect to FIG. 7 is advantageously equipped with interaction means such as a keyboard a mouse, a joystick or any other modes for introduction of commands such as for example vocal recognition being also possible.

The invention claimed is:
1. A method for generating a depth map associated with a scene, wherein depth information being associated with each first pixel of a plurality of first pixels of the depth map, the method comprising
   storing, in a memory device, at least a first information in the depth map in addition to the depth information, said at least a first information being associated with said each first pixel, and being representative of a first variation of depth in said each first pixel according to a first axis of a space of the depth map, and representative of a second variation of depth in said each first pixel according to a second axis of the space of the depth map, wherein, for said each first pixel, said first variation of depth corresponds to a partial depth derivative at a center of said each first pixel along the first axis and said second variation of depth corresponds to a partial depth derivative at said centre of said each first pixel along the second axis; and
   rendering an image according to said at least a first information stored in the depth map, a depth information associated with a point belonging to said each first pixel and distinct from the centre of said each first pixel being calculated from the depth information and said at least a first information associated with said each first pixel.
2. The method according to claim 1, wherein the at least a first information is established from a single surface element of the scene projected into the space of a camera field of view associated with the depth map, said projected surface element comprising said each first pixel.

3. The method according to claim 2, wherein the at least a first information is established from said depth information associated with said each first pixel and from depth information associated with at least a second element, said each first pixel and the at least a second pixel belonging to said single surface element of the scene projected into the depth map.

4. The method according to claim 3, wherein the at least a first information is established by computing said first variation of depth as a ratio of the difference between the depth information associated with said each first pixel and the depth information associated with a second pixel adjacent to said each first pixel along the first axis to a distance between said each first pixel and the second pixel along the first axis and by computing said second variation of depth as the ratio of the difference between the depth information associated with said each first pixel and the depth information associated with a third pixel adjacent to said each first pixel along the second axis to the distance between said each first pixel and said third pixel along the second axis.

5. The method according to claim 2, wherein the at least a first information is established from an equation of said single surface element of the scene projected into a space of a camera field of view associated with the depth map, said projected surface element comprising said each first pixel.

6. The method according to claim 2, wherein said single surface element is a mesh element.

7. The method according to claim 1, wherein one first information is established for each dimension of the space of the depth map.

8. A device for generating a depth map associated with a scene, depth information being associated with each first pixel of a plurality of first pixels of the depth map, wherein the device comprises at least one processor configured to
store, in a memory device, at least a first information in the depth map in addition to the depth information, said at least a first information being associated with said each first pixel, and being representative of a first variation of depth in said each first pixel according to a first axis of a space of the depth map, and representative of a second variation of depth in said each first pixel according to a second axis of the space of the depth map, wherein, for said each first pixel, said first variation of depth corresponds to a partial depth derivative at a centre of said each first pixel along the first axis and said second variation of depth corresponds to a partial depth derivative of said centre of said each first pixel along the second axis, and
render an image according to said at least a first information stored in the depth map, a depth information associated with a point belonging to said each first pixel and distinct from the centre of said each first pixel being calculated from the depth information and said at least a first information associated with said each first pixel.

9. The device according to claim 8, wherein the at least one processor is a Graphical Processor Unit (GPU).

10. The device according to claim 8, wherein the at least one processor is further configured to compute the at least a first information from a single surface element of the scene projected into the space of a camera field of view associated with the depth map, said projected surface element comprising said each first pixel.

11. The device according to claim 10, wherein the at least one processor is further configured to compute the at least a first information from said depth information associated with said each first pixel and from depth information associated with at least a second pixel, said each first pixel and the at least a second element belonging to said single surface pixel of the scene projected into the depth map.

12. The device according to claim 11, wherein the at least one processor is further configured to compute the first variation of depth as a ratio of the difference between the depth information associated with said each first pixel and the depth information associated with the second pixel adjacent to said each first pixel along the first axis to a distance between said each first pixel and the second pixel along the first axis and by computing said second variation of depth as the ratio of the difference between the depth information associated with said each first pixel and the depth information associated with a third pixel adjacent to said each first pixel along the second axis to the distance said each first pixel and said third pixel along the second axis between said each first pixel and said third pixel along the second axis.

13. The device according to claim 10, wherein the at least one processor is further configured to compute the at least a first information from an equation of said single surface element of the scene projected into the space of a camera field of view associated with the depth map, said projected surface element comprising said each first pixel.

14. The device according to claim 10, wherein said single surface element is a mesh element.

15. The device according to claim 8, wherein the at least one processor is further configured to generate one first information for each dimension of the space of the depth map.

16. A non-transitory processor readable medium having stored therein instructions for causing a processor to perform the method according to claim 1.

* * * * *